(12) United States Patent
Miikkulainen et al.

(10) Patent No.: US 10,443,839 B2
(45) Date of Patent: Oct. 15, 2019

(54) METHOD OF REDUCING FLUE GAS EMISSIONS AND A BOILER

(71) Applicant: Andritz Oy, Helsinki (FI)

(72) Inventors: Pasi Miikkulainen, Kotka (FI); Lauri Pakarinen, Kotka (FI)

(73) Assignee: ANDRITZ OY, Helsinki (FI)

( * ) Notice: Subject to any disclaimer, the term of this patent is extended or adjusted under 35 U.S.C. 154(b) by 109 days.

(21) Appl. No.: 15/094,154

(22) Filed: Apr. 8, 2016

(65) Prior Publication Data

US 2016/0245510 A1 Aug. 25, 2016

Related U.S. Application Data

(62) Division of application No. 13/264,516, filed as application No. PCT/FI2010/050298 on Apr. 14, 2010, now Pat. No. 9,310,075.

(30) Foreign Application Priority Data

Apr. 15, 2009 (FI) .................................. 20090141

(51) Int. Cl.
*F23J 15/00* (2006.01)
*F22B 21/40* (2006.01)
(Continued)

(52) U.S. Cl.
CPC ............ *F23J 15/003* (2013.01); *B01D 53/56* (2013.01); *F22B 21/341* (2013.01); *F22B 21/40* (2013.01);
(Continued)

(58) Field of Classification Search
CPC ............... F23G 2209/101; F23J 15/003; F23J 2215/101; F22B 21/341; F22B 21/343; F22B 21/40; B01D 53/56; B01D 53/565
See application file for complete search history.

(56) References Cited

U.S. PATENT DOCUMENTS 2,591,188 A * 4/1952 Nilsson .................. D21C 11/12
159/4.02
2,865,344 A * 12/1958 Firl ....................... F22B 21/341
110/264
(Continued)

FOREIGN PATENT DOCUMENTS

EP 0 989 365 3/2000
EP 1 530 994 5/2005
(Continued)

OTHER PUBLICATIONS

M. Lundberg et al., "Effect of Ammonia Injection on Black Liquor Recovery Boiler NOx Emissions and Ash Chemistry," TAPPI Engineering, Pulping & Environmental Conference (EPE 2008), Aug. 24-27, 2008, Portland, Oregon, USA, 7 pages.
(Continued)

*Primary Examiner* — Steven S Anderson, II
(74) *Attorney, Agent, or Firm* — Nixon & Vanderhye P.C.

(57) ABSTRACT

A method and a boiler for decreasing the amount of nitrogen oxides in flue gases of a boiler, which flue gases are generated in the combustion of fuels and air. The boiler has a water circulation system comprising superheaters and a furnace for combustion of fuel and for generating flue gases that contain nitrogen oxides, which flue gases mainly flow upwards in the furnace and further to the superheater zone and via other heat recovery surfaces of the boiler out of the boiler, and a nitrogen oxides reducing agent is introduced into the flue gases. The nitrogen oxides reducing agent is introduced into the flue gases prior to the superheater zone, after the temperature of the flue gases is decreased by at least one heat exchanger that is located upstream of the nose of the boiler and upstream of the introduction of the nitrogen oxides reducing agent.

19 Claims, 2 Drawing Sheets

(51) Int. Cl.
*F22B 21/34* (2006.01)
*B01D 53/56* (2006.01)
(52) U.S. Cl.
CPC ............ *B01D 2251/2062* (2013.01); *B01D 2251/2067* (2013.01); *F23G 2209/101* (2013.01); *F23J 2215/101* (2013.01); *Y02P 80/154* (2015.11)

(56) References Cited

U.S. PATENT DOCUMENTS

| | | | | |
|---|---|---|---|---|
| 3,060,907 | A * | 10/1962 | Blodgett | F22B 21/345 122/478 |
| 3,161,475 | A * | 12/1964 | Wilcoxson | D21C 11/12 159/4.02 |
| 3,164,204 | A * | 1/1965 | Hingst | F23L 15/04 122/7 R |
| 3,625,186 | A * | 12/1971 | Herbst | F22B 31/045 122/448.1 |
| 4,462,319 | A * | 7/1984 | Larsen | A62C 31/22 110/238 |
| 4,545,411 | A * | 10/1985 | Wierzba | F23J 7/00 122/390 |
| 4,823,710 | A * | 4/1989 | Garrido | F23L 7/00 110/234 |
| 5,299,534 | A | 4/1994 | Janka | |
| 5,327,726 | A * | 7/1994 | Daman | F01K 23/067 60/648 |
| 5,342,592 | A * | 8/1994 | Peter-Hoblyn | B01D 53/56 422/168 |
| 5,343,820 | A | 9/1994 | Marion | |
| 5,407,649 | A | 4/1995 | Andersson et al. | |
| 5,635,095 | A * | 6/1997 | Kleinfeld | D21C 11/122 222/590 |
| 5,715,763 | A * | 2/1998 | Fornetti | D21C 11/12 110/238 |
| 5,820,838 | A | 10/1998 | Tsuo et al. | |
| 5,911,956 | A | 6/1999 | Viel Lamare et al. | |
| 6,019,068 | A | 2/2000 | Tsuo et al. | |
| 6,021,743 | A * | 2/2000 | Bauer | F22B 31/045 110/347 |
| 6,178,924 | B1 * | 1/2001 | Hakulinen | D21C 11/12 122/235.33 |
| 6,280,695 | B1 * | 8/2001 | Lissianski | B01D 53/56 110/203 |
| 2005/0061217 | A1 * | 3/2005 | Uppstu | F23G 7/04 110/238 |
| 2006/0065291 | A1 | 3/2006 | Jones et al. | |
| 2006/0249098 | A1 * | 11/2006 | Raukola | D21C 11/12 122/7 R |
| 2008/0110381 | A1 | 5/2008 | Swanson et al. | |
| 2008/0175774 | A1 | 7/2008 | Morrison et al. | |
| 2009/0031929 | A1 | 2/2009 | Boardman et al. | |
| 2009/0084327 | A1 | 4/2009 | Cole | |
| 2009/0194262 | A1 * | 8/2009 | Roppo | F22G 3/008 165/134.1 |
| 2010/0203461 | A1 * | 8/2010 | Maly | F23C 6/045 431/9 |
| 2012/0185641 | A1 | 7/2012 | Miikkulainen et al. | |

FOREIGN PATENT DOCUMENTS

| | | | | |
|---|---|---|---|---|
| EP | 2 071 239 | | 6/2009 | |
| GB | 2375160 | A * | 11/2002 | ............ B01D 53/56 |
| WO | 98/12378 | | 3/1998 | |

OTHER PUBLICATIONS

M. Lundberg et al., "Effect of Ammonia Injection on Black Liquor Recovery Boiler NOx Emissions and Ash Chemistry," Presentation Slides, EPE 2008—Engineering, Pulping & Environmental Conference, Aug. 24-27, 2008, Portland, Oregon, USA, 15 pages.
Wikipedia article, "Recovery boiler", last modified Nov. 29, 2015, obtained Feb. 25, 2016 from https://en.wikipedia.org/wiki/Recovery_boiler, 10 pages.
Wikipedia article, "Black liquor", last modified Feb. 4, 2016, obtained Feb. 25, 2016 from https://en.wikipedia.org/wiki/Black_liquor, 4 pages.
Wikipedia article, "Pulp mill", last modified Feb. 10, 2016, obtained Feb. 25, 2016 from https://en.wikipedia.org/wiki/Pulp_mill, 4 pages.
Valmet Technologies, Notice of Opposition against European Patent No. 2 419 197, dated Jul. 14, 2016, 24 pages.
Amec Foster Wheeler Energia Oy, Notice of Opposition against European Patent No. 2 419 197, dated Aug. 9, 2016, 24 pages.

* cited by examiner

METHOD OF REDUCING FLUE GAS EMISSIONS AND A BOILER

RELATED APPLICATIONS

This application is a divisional of U.S. application Ser. No. 13/264,516, (now U.S. Pat. No. 9,310,075), which is the U.S. national phase of International Application No. PCT/FI2010/050298 filed 14 Apr. 2010 which designated the U.S. and claims priority to Finnish Patent Application No. 20090141 filed 15 Apr. 2009, the entirety of these applications are incorporated by reference.

BACKGROUND OF INVENTION

The present invention relates to a method of decreasing an amount of nitrogen oxides from flue gases of a boiler, which nitrogen oxides are generated in the combustion of fuels and air or other oxygen-containing gas. The invention also relates to a steam-generating boiler.

Flue gases of steam-generating boilers, such as a recovery boiler of a chemical pulp mill, are led from the furnace into contact with various heat exchangers, superheaters, boiler bank and water preheaters of the boiler, whereby the heat contained in the gases is recovered in the water, steam or mixture thereof flowing in the heat exchangers. The boiler bank refers to a heat exchanger comprising heat exchange elements, inside which the boiler water to be heated flows. The economizer (preheater) of the boiler refers to a heat exchanger comprising heat exchange elements, inside which the boiler feed water to be heated flows. Free space for flue gas flow remains in the boiler bank and the economizer between the heat exchanger elements. As the flue gas passes by the heat exchanger elements, heat is transferred into the feed water or boiler water flowing inside the elements. From the economizer the flue gases of the boiler are led in a way known per se via a flue gas discharge conduit to gas purification following the boiler, such as an electrostatic precipitator.

FIG. 1 illustrates the construction of a chemical recovery boiler having a furnace 1 defined by water tube walls: front wall 2, side walls 3 and rear wall 4, as well as a bottom 5 formed of water tubes. Combustion air is fed into the furnace from several different levels as primary, secondary and tertiary air. There may be also other air levels. Waste liquid, such as black liquor, is led via nozzles 6 located between the secondary and tertiary air zones. During combustion, the waste liquid forms a smelt bed on the bottom 5 of the furnace, wherefrom the smelt is discharged via a smelt spout 7 adapted in the lower part of the furnace.

Above the furnace, heat recovery surfaces, i.e. superheaters 8 are provided, and the heat exchangers, a boiler bank 9 and economizers 10, follow the superheaters located above the furnace and are positioned on the side of the rear wall 4. The heat generated in the furnace is recovered in said boiler bank and economizers. On the boiler banks 9, water in saturated temperature is boiled partly into steam and in feed water preheaters 10 the water is heated by means of flue gas prior to leading the water into the steam-generating part 9 and the superheating parts 8 of the boiler. In the superheaters, the saturated steam is heated to generate steam at a higher temperature. The so-called bullnose is marked with reference numeral 14.

The water/steam circulation of the boiler is arranged via natural circulation, whereby the water/steam mixture formed in the water tubes of the walls and bottom of the furnace rises upwards via collection tubes into a steam drum 11 that is located crosswise in relation to the boiler, i.e. parallel to the front wall 2. Hot water flows from the steam drum via downcomers 12 into a manifold 13 on the bottom, wherefrom the water is distributed into the bottom water tubes and further into the water tube walls.

A waste liquor recovery boiler is conventionally formed of the following main parts, which are illustrated schematically in FIG. 1 which shows:

A lower part 16 of the furnace, where combustion of waste liquor mainly takes place.

A middle part 17 of the furnace, where final combustion of gaseous combustible substances mainly takes place.

An upper part 18 of the furnace

A superheater zone 8, wherein the saturated steam exiting the steam drum 11 is transformed into (superheated) steam having a higher temperature. In the superheater zone or upstream thereof there is often provided a so-called screen tube system 15 that usually boils water.

A boiler bank 9, i.e. water vaporizer, wherein water at a saturated temperature is partly boiled into steam.

Feed water preheaters, i.e. so-called economizers 10, wherein the feed water flowing in the heat transfer elements is preheated by means of flue gases prior to leading the water into the drum 11 and the steam-generating parts 9 and superheating parts 8 of the boiler.

A drum (or steam drum) 11 with water in the lower part and saturated steam in the upper part. Some boilers have two drums: a steam drum (upper drum) and a water drum (lower drum), wherebetween a heat transfer element, so-called boiler tubes for boiling the water are provided.

A bullnose, where the boiler narrows and which is a common boundary area between the furnace and the heat recovery surfaces, is located at the upper part of the furnace on the rear wall of the boiler. The bullnose is formed of a recess in the rear wall of the boiler, which recess is directed towards the front wall of the boiler. Thus, the bullnose comprises a lower wall part that is typically directed diagonally from the rear wall towards the front wall of the boiler, an upper wall part that is directed from the front wall of the boiler diagonally towards the rear wall, and a bullnose arch or tip that combines these. The purpose of the bullnose area is to protect the superheater part against direct heat radiation from the furnace and to assist the upwards flowing flue gas in turning around the corner towards the flue gas discharge conduit of the boiler so that the gases flow evenly by the heat recovery surfaces. The so-called depth of the bullnose, which plays an important part in guiding the flue gas flow into the upper part of the furnace, is e.g. in single drum boilers typically 40-50% of the total depth of the furnace, which means the horizontal length of the side wall of the furnace.

Many recovery boilers are additionally provided with screen tubes upstream of the superheaters in the gas flow direction typically horizontally at the deepest part of the bullnose. Typically, a saturated mixture of water and steam flows in the screen tubes, which is connected to the water circulation of the boiler. The purpose of the screen is to cool the flue gases to some extent before they enter the superheater zone, to prevent heat radiation from the furnace to the superheater tubes and to retain a part of so-called carry-over particles escaping from the furnace.

An abundant amount of flue gases containing various impurities, such as nitrogen oxides, are generated in the combustion of various fuels, such as black liquor. During combustion, nitrogen oxide is generated from a part of nitrogen entrained in air and fuel, while the rest of the nitrogen exits as molecular nitrogen ($N_2$) and as small amounts of hazardous compounds such as dinitrogen oxide ($N_2O$), ammonia ($NH_3$) and hydrogen cyanide (HCN). Nitrogen oxides are formed via several various routes, depending on the conditions and fuels.

The purpose of methods for removing nitrogen oxides is to minimize polluting nitrogen oxide emissions and thus to maximize the portion of harmless molecular nitrogen $N_2$, simultaneously keeping the emissions of all other hazardous compounds at a low level. Typical nitrogen oxide removal methods include fuel staging, air staging and selective non-catalytic reduction, SNCR.

Selective non-catalytic reduction is reduction of nitrogen oxide generated in combustion by addition of a reagent, such as ammonia. The efficiency of the method is influenced by operation conditions, the composition of the fuel and the reagent present. Thus, this technique has provided known embodiments, comprising a fuel-lean process using ammonia, [U.S. Pat. No. 3,900,554], a fuel-rich process using ammonia [U.S. Pat. No. 4,325,924], and a fuel-rich process using urea [U.S. Pat. No. 4,335,084].

SNCR variations comprise addition of a reducing agent via various flows, e.g. with reburning fuel, with air or alone. The operation of each variation is limited to precisely determined conditions. In the absence of carbon monoxide (CO), fuel-lean SNCR operates in ranges 1100-1400 K (827-1127° C.), while fuel-rich SNCR operates at higher temperatures. However, carbon monoxide is present in almost all processes utilizing the SNCR-method, and the detrimental result thereof is shifting and narrowing of temperature windows. Optimal conditions for SNCR are hard to create in several combustion apparatuses.

U.S. Pat. No. 5,820,838 describes a circulating fluidized bed boiler, where heat transfer pipes, such as omega-pipes, are installed in the flue gas flow. In the solution, means for injecting an agent that reacts with nitrogen oxides (e.g. ammonia or urea) are integrated in the omega-pipes. The aim is to obtain adequate cooling of the reducing agent to a low temperature, e.g. 100-600° C., while injecting so that the reducing agent does not decompose. However, in this patent no attention has been paid to creating a suitable temperature window between nitrogen oxide and the reducing agent.

Decreasing of NOx-contents in recovery boilers has already been applied by methods based on staging or SNCR-technique using i) "quaternary air" in the upper part of the recovery boiler at a high level, in one embodiment of which ammonia is added entrained in said air (WO 97/21869), ii) "vertical air staging" [FI 101420 B], where air jets are fed into the furnace of the recovery boiler by means of nozzles located at several vertical elevations, iii) "Mitsubishi Advanced Combustion Technology" (MACT) [Arakawa Y., Ichinose T., Okamoto A., Baba Y, Sakai T., in Proc. of the Int. Chemical Recovery Conf., Whistler, British Columbia, June 11-14, 257-260, 2001], where a reducing agent (urea) can be added after air staging, and iv) black liquor staging [FI Patent 103905], where black liquor is fed from at least two levels into a furnace having vertical air staging according to (ii). By means of these techniques, a NOx-reduction of 30-50% has been reached, but in practice they require adjustments that are not optimal for a recovery boiler. Often these techniques require oversized furnaces for keeping the temperature after the furnace adequately low and/or more expensive material solutions for preventing corrosion. In practice staged combustion or SNCR-technique in recovery boilers requires temperatures even as low as 850-1000° C., which are reached only in such recovery boilers that are bigger and thus more expensive than conventional boilers.

SUMMARY OF INVENTION

A method has been conceived for controlling the emissions of detrimental nitrogen compounds, especially nitrogen oxides, entering from combustion processes, in a way that is more efficient and more economical than the methods described in the above. Especially a purpose of the present invention is to provide a method and an apparatus for arranging a suitable temperature window for a method of removing nitrogen oxides based on SNCR-technique. The present invention can be applied especially in a chemical recovery boiler, but also in other steam-generating boilers, where creating a temperature window required by the SNCR-technique is needed.

A method has been conceived of decreasing the amount of nitrogen oxides from flue gases of a boiler, which nitrogen oxides are generated in combustion of fuels and air, said boiler having a water circulation system comprising superheaters and a furnace for combusting fuel and for generating flue gases containing nitrogen oxides, which flue gases flow mainly upwards in the furnace and further to a superheater zone and via other heat recovery surfaces of the boiler out of the boiler, and an agent for reducing nitrogen oxides is introduced in said flue gases. The nitrogen oxides reducing agent is introduced into the flue gases prior to the superheater zone, before which the temperature of the flue gases is decreased by means of at least one heat exchanger that is located in the flue gas flow upstream of the introduction of the reducing agent, for obtaining a suitable temperature window in the flue gas flow in order to reduce nitrogen oxides.

Also, a steam-generating boiler has been conceived having a water circulation system comprising heat recovery surfaces, such as superheaters, and a furnace for combusting fuel and for generating flue gases, which flue gases flow mainly upwards in the furnace and further to a superheater zone and via other heat recovery surfaces out of the boiler, and feeding means for introducing an agent for reducing nitrogen oxides in the flue gases. One or more heat exchangers are located in the flue gas flow in the furnace for decreasing the temperature of the flue gases and for creating a suitable temperature window in the flue gas flow for reducing nitrogen oxides, and that the feeding means for the reducing agent are located in the flue gas flow direction after one or more heat exchangers and prior to the superheater zone.

In this connection, a heat exchanger refers to an apparatus, wherein heat is recovered from flue gas indirectly into a medium. Typically the apparatus comprises pipes, inside which the medium receiving heat from the flue gases flows.

Heat may be recovered from flue gases in said heat exchanger or heat surface into the water circulation system of the boiler for superheating steam and/or for boiling boiler water and/or for preheating feed water. Heat can be recovered also for heating combustion air of the boiler and/or for heating another medium by means of the heat exchanger. Heat is recovered from flue gases by a heat exchanger mounted in the upper part of the furnace, the number of said heat exchangers being at least one, and thus the temperature of the flue gas is decreased to be suitable for decreasing the nitrogen oxide amount by means of a reducing agent, such as ammonia.

The heat exchanger or heat exchangers are located in such a point that an adequate volume is formed for feeding a reagent and for reacting at a proper temperature prior to the superheater zone that typically is located above the bullnose.

As earlier described, a boiler, especially a chemical recovery boiler, can be provided with screen tubes upstream of the superheaters in the gas flow direction, typically horizontally at the deepest point of the bullnose. In the arrangement according to the present invention said heat exchanger can be a screen tube system located in accordance with one preferred embodiment in the vertical direction of the furnace at such an elevation that a space favorable to injecting a SNCR-reagent is formed screen tube system in the flue gas flow upstream of the superheaters located above the bullnose.

As mentioned earlier, the bullnose of the boiler forms a recess in the rear wall of the boiler, which recess is directed towards the front wall of the boiler. Thus, the bullnose comprises a lower wall part that is typically directed diagonally from the rear wall towards the front wall of the boiler, an upper wall part that is directed from the front wall of the boiler diagonally towards the rear wall, and a bullnose arch or tip that can also be a mainly upright wall part (the vertical part of the rear wall of the boiler). According to an embodiment of the invention, said at least one heat exchanger, such as screen, is located in the elevational direction of the boiler below the bullnose. Depending on the shape of the bullnose, at least one heat exchanger, such as a screen, can according to an embodiment of the invention also be located in the area of the bullnose. In that case the tip of the bullnose is preferably formed of a vertical wall part combining the inclined lower and upper walls, whereby the bullnose area in the vertical direction is adequately long for locating the heat exchanger or heat exchangers.

In the solution according to the invention, the heat exchanger or heat exchangers are to be located at such a distance from the superheaters thereabove that between the heat exchanger and the superheater an agent for reducing nitrogen oxides can be fed in an advantageous way so that said reducing agent has enough time to react with the nitrogen oxides for removing them from the flue gas to the largest possible extent prior to the superheater zone. The required distance is influenced by retention time, the efficiency of mixing of the reducing agent with the flue gas and the temperature of the flue gas.

An advantage of the invention is that the agent reacting with NOx (e.g. ammonia or urea) can be injected in the proper temperature window in large volume, whereby an adequate retention time is obtained. The agent can be introduced e.g. entrained in air jets above a heat exchanger, such as screen, by evaporating the ammonia into the air, whereby efficient mixing is obtained simultaneously. An additional advantage worth mentioning is that the location of the screen in accordance with the invention decreases the escape of liquor particles, i.e. so-called carry over up onto the superheater surfaces.

In the solution of the invention preferably at least one heat exchanger that is located in the flue gas flow direction upstream of the injection of a SNCR-reagent acts as a superheater. In other words, at least part of the screen transfers heat from the flue gas into the superheated steam. Thus, the size of the boiler or the volume of the superheating surface does not grow, because the screen tubes form a part of the superheating surface capacity required in the boiler.

The heat exchanger or heat exchangers located upstream of the injection of the SNCR-reagent are dimensioned such that the flue gas temperature decreased adequately for obtaining the desired temperature window. So, in accordance with the invention, a number of heat exchangers with adequate capacity for decreasing the flue gas temperature for a suitable temperature window is located in the flue gas flow upstream of the reaction of the reagent and the nitrogen oxides in the flue gas.

The solution according to the invention allows lowering the height of the superheaters that typically are located above the bullnose and thus also lowering the total height of the boiler.

Obtaining the desired temperature window in the furnace of a boiler where heat is transferred mainly into the walls of the furnace only, would make the furnace of the boiler, and thus whole boiler and the boiler plant very high.

The invention allows utilizing the SNCR-technique especially in a chemical recovery boiler or other steam boiler where mixing of injected ammonia or urea is difficult, at a required temperature.

By installing in accordance with the invention at least one heat exchanger in the furnace upstream of the injection of an agent (e.g. ammonia) reacting with NOx, a lower temperature is obtained, which allows introducing the reducing agent in a proper temperature window in the furnace, whereby nitrogen oxides form nitrogen and water. This has been problematic especially in a chemical recovery boiler of a chemical pulp mill where the temperatures in the furnace are typically too high for applying the SNCR-method. Additionally, passing of a reducing agent, such as ammonia or urea, on the superheater surfaces is undesired, because feeding of substances at a later stage would be disadvantageous due to superheater corrosion. In bubbling fluidized bed (BFB) boilers the temperatures are typically lower than in a recovery boiler, but the present invention can be applied in connection with them as well, if needed.

The present invention allows e.g. feeding the injected reducing agent, such as urea and/or ammonia together with a medium, e.g. air or circulated flue gas, effectively in the furnace upstream of the superheaters, which thus will be better protected against possible corrosive effect of the SNCR-agent. Feeding of the reducing agent together with combustion air of the boiler is advantageous, because then there is no need to provide the boiler with additional openings for feeding said agent. The carrier gas for the reducing agent can originate from the boiler's combustion air system or a separate dedicated gas source. The flue gas used as carrier gas can originate from a boiler wherein the invention is applied or from another boiler at the mill.

The feeding can be effected with ammonia gas also pressurized together with steam. Ammonia can also be sucked from a container by means of a steam ejector and injected into the boiler together with steam. The ammonia can also be liquefied, mixed into water and sprayed into the boiler.

In the feed of the reducing agent, the medium can also be e.g. a combination of the above mentioned media, e.g. air and flue gas.

The present invention provides a simple method of controlling the emissions of detrimental nitrogen oxide compounds from combustion processes.

SUMMARY OF DRAWINGS

The present invention is described in more detail in the following with reference to the appended figures, of which:

FIGS. 2a-2c use the same reference numerals as FIG. 1 where applicable.

DETAILED DESCRIPTION OF INVENTION

Figure 1:
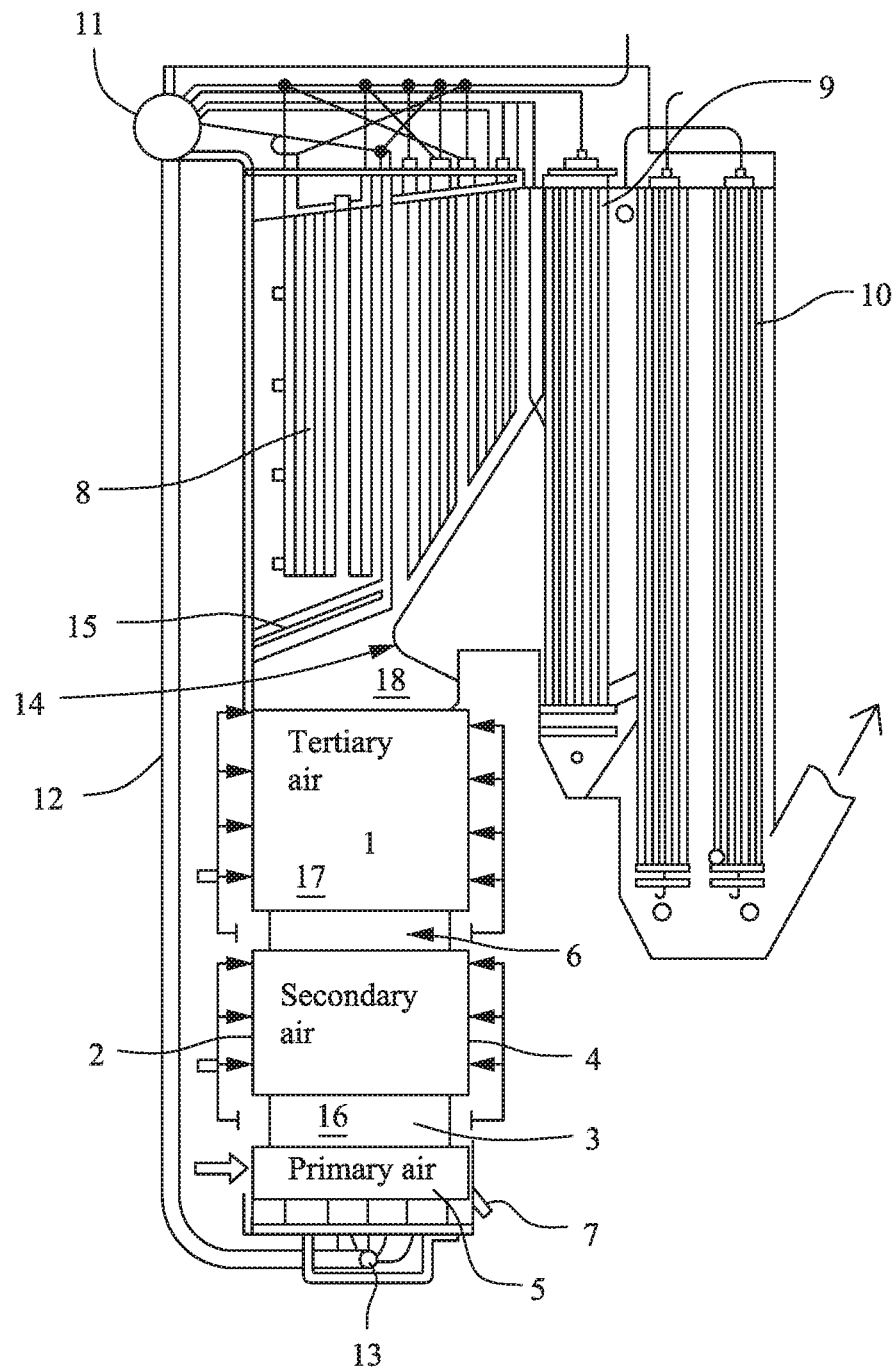
FIG. 1 illustrates schematically a chemical recovery boiler know per se.
Figure 2C:
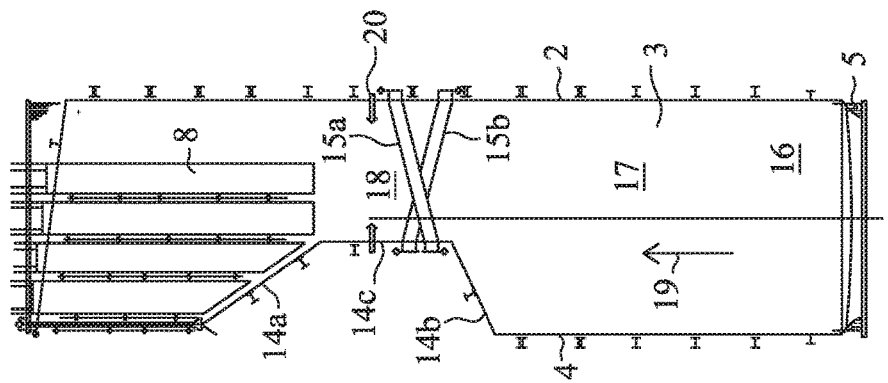
FIGS. 2a, 2b and 2c illustrate schematically some embodiments of the invention.
Figure 2B:
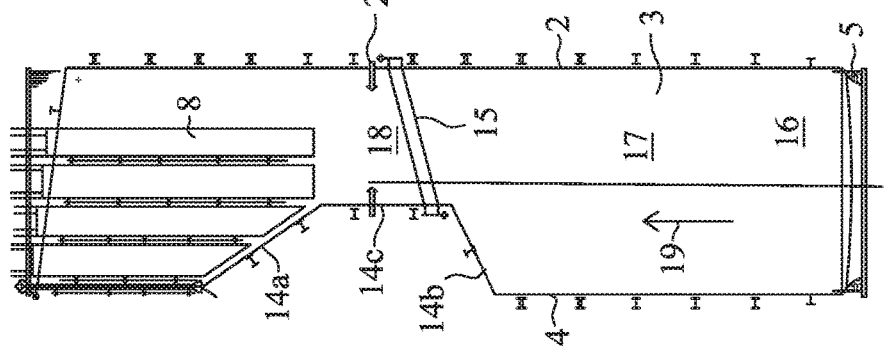
Figure 2A:
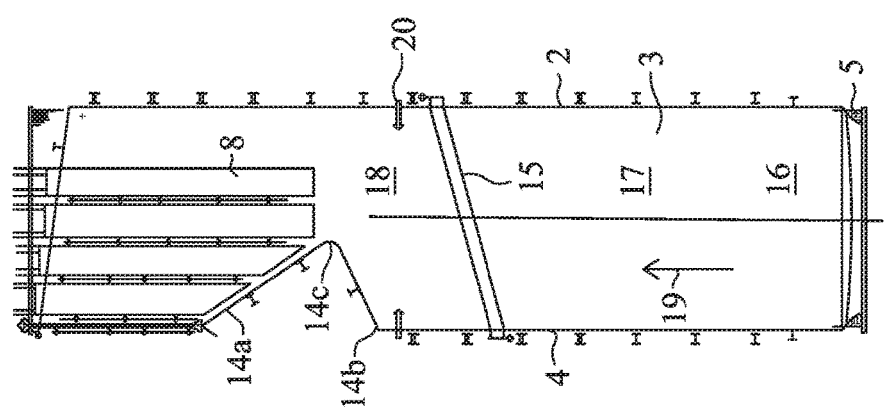

FIGS. 2a-2c illustrate the construction of a recovery boiler having a furnace defined by water tube walls: a front wall 2, side walls 3 and a rear wall 4, as well as a bottom 5 formed of water tubes. Superheaters 8 of the boiler are located above the furnace.

A lower part 16 of the furnace, where the combustion of waste liquor mainly takes place.

A middle part 17 of the furnace, where the final combustion of gaseous combustible substances mainly takes place.

An upper part 18 of the furnace

A superheater area 8, wherein the saturated steam exiting the steam drum is heated into (superheated) steam having a higher temperature. A so-called screen tube system 15 is provided in the flue gas flow direction upstream of the superheater zone above the bullnose.

Flue gas generated in the furnace flows upwards into the upper part of the furnace and further to other heat recovery parts of the boiler, such as superheaters 8. The main flow direction of the flue gas is marked with an arrow 19.

A bullnose 14, where the boiler narrows and which is a common boundary area between the furnace and the heat recovery surfaces, is located at the upper part 18 of the furnace on the rear 4 wall of the boiler. The bullnose is formed of a recess in the rear wall of the boiler, which recess is directed towards the front wall 2 of the boiler. Thus, the bullnose comprises a lower wall part 14b that is typically directed diagonally from the rear wall 4 towards the front wall 2 of the boiler, an upper wall part 14a that is directed from the front wall 2 of the boiler diagonally towards the rear wall 4, and a bullnose arch or tip 14c that combines these.

FIG. 2a illustrates a heat exchanger according to the invention, in this case a screen 15, located in the upwards flowing flue gas flow 19 below the bullnose 14 of the boiler. Feeding means 20 for an agent reducing nitrogen oxides are located between the screen and the lower edge 8a of the superheater 8. The screen 15 extends from the front wall to the rear wall, whereby it covers the horizontal cross-sectional surface of the furnace, whereby the screen gets well into contact with the upwards flowing flue gas, and thus the temperature of the flue gas can be decreased to be advantageous for the reduction of nitrogen oxides. The screen acts in this embodiment advantageously at least partly as a superheating surface. As the screen acts partly as superheating surface, part of the screen acts as evaporator for water. A screen acting as a heat exchanger is dimensioned so that the temperature of flue gas decreases adequately in order to achieve a desired temperature window.

In the embodiment of FIG. 2a, where the heat exchanger cooling the flue gas is located below the bullnose, the reducing agent is introduced e.g. with tertiary air.

The tip of the bullnose can also be a mainly vertical wall part 14c (FIGS. 2b and 2c). In this case, according to an embodiment of the invention, the heat exchanger or heat exchanging surface, such as a screen, is located in the area of the bullnose tip (FIG. 2b). In that case the tip of the bullnose is preferably formed of a vertical wall part combining the inclined lower and upper walls, whereby the bullnose area in the vertical direction is adequately long for locating the heat exchanger 15 and the means 20 for feeding the reducing agent. The distance of the heat exchanger from the superheaters 8 has to be adequate in order to provide the nitrogen oxides and the reducing agent enough time to react prior to the superheater zone.

In the embodiment of FIG. 2c the tip of the bullnose is also a mainly upright wall part 14c. The area of the bullnose tip is provided with screens 15a and 15b located crosswise and staggered, which is advantageous in view of space utilization. In this case, means 20 for feeding a reducing agent for nitrogen oxides are provided also above the screen.

In the embodiments of FIGS. 2b and 2c the reducing agent, such as ammonia is preferably introduced entrained in air or by circulating flue gas or in another way described in the above.

The solution according to the present invention allows arranging a suitable temperature window in a steam-generating boiler, especially a chemical recovery boiler for a method of removing nitrogen oxides based on SNCR-technique.

Although only some preferred embodiments of the method according to the invention have been described in the above, the invention covers all such modifications and variations that are included in the scope defined in the claims.

The invention is:

1. A method to decrease nitrogen oxides in flue gases flowing through a recovery boiler, wherein the recovery boiler includes a smelt spout at or near a bottom of the recovery boiler, a waste liquor injection nozzle aligned with a furnace zone above the bottom, and walls extending upward from the bottom, wherein the walls include water tubes, and a gas path is defined by the walls, and the walls include a bullnose section forming a narrowed section of the gas path, wherein the gas path includes the furnace zone and extends upwards towards the bullnose, the narrowed section formed by the bullnose, and a superheater zone extending upward from the bullnose, the recovery boiler further including a water circulation system comprising the water tubes in the furnace zone, and superheaters in the superheater zone, wherein a screen in the furnace zone of the recovery boiler and covers an entire cross section of the gas path below the bullnose, and the screen includes a heat exchanger;

the method comprising:

injecting into the furnace zone through the waste liquor injection nozzle a waste liquor;

combusting the waste liquor and oxygen in the furnace zone, wherein the combustion generates flue gases containing nitrogen oxides;

discharging smelt formed during the combustion from the smelt spout;

confining the flue gases to the gas path such that the flue gases flow from the furnace zone, through the narrowed section at the bullnose, through the superheater zone and exhausts from the recovery boiler, introducing an agent into the furnace zone of the gas path, above the heat exchanger and below the bullnose, wherein the introduction of the agent reduces nitrogen oxides in the flue gases while the flue gases are in the furnace zone, while the flue gases are in the furnace zone, and upstream of the introduction of the agent, cooling the flue gases by passing the flue gases through the heat exchanger of the screen, wherein the flue gases are cooled to temperature within a certain temperate range selected based on the agent to be injected conforms to temperatures suited to the introduction of the agent and the reduction of nitrogen oxides, suppressing radiant heat from heating the introduced agent by the screen which separates the agent from the furnace, and moving the flue gases a distance above the heat exchanger and along the gas path selected to promote reactions between the agent and flue gases, wherein the distance is downstream of the heat exchanger and upstream of the superheater zone.

2. The method according to claim 1, wherein, in the heat exchanger in the screen, heat is recovered from the flue gases for superheating steam.

3. The method according to claim 1, wherein, in the heat exchanger in the screen, heat is recovered from the flue gases and used to evaporate boiler water.

4. The method according to claim 1, wherein, in the heat exchanger in the screen, heat is recovered from the flue gases and used to preheat boiler feed water.

5. The method according to claim 1, wherein, in the heat exchanger of the screen, heat is recovered from the flue gases and used to heat combustion air for the recovery boiler.

6. The method according to claim 1, wherein the agent is conveyed by a medium into the flue gas flow.

7. The method according to claim 6, wherein the agent is conveyed by air to the flue gas flow.

8. The method according to claim 6, wherein the agent is conveyed by flue gas to the flue gas flow.

9. The method according to claim 1, wherein the agent for reducing nitrogen oxides is ammonia, urea or a precursor producing ammonia.

10. The method according to claim 1, further comprising combusting black liquor in the furnace.

11. A steam-generating recovery boiler having a boiler water circulation system comprising:
walls defining a flue gas passage, wherein the flue gas passage includes a furnace zone and a superheater zone;
a waste liquor injection nozzle extending through the walls;
a smelt spout extending through the walls or a bottom of the recovery boiler;
a bullnose in at least one of the walls between the furnace zone and the superheater zone, the bullnose is aligned with a narrowest region of the flue gas passage;
heat recovery surfaces in the superheater zone and arranged within the flue gas passage;
a furnace within which waste liquor, injected through the waste liquor injection nozzle, is combusted, flue gases are generated, and smelt is discharged through the smelt spout, wherein the furnace is within the furnace zone;
wherein the walls adjacent the furnace zone including water tubes and extend upward and the flue gas passage extends upward through the furnace zone;
a feeder extending through the walls upstream of the bullnose and configured to introduce a reducing agent into the flue gases in the furnace zone and upstream of the superheater zone, wherein the reducing agent reduces nitrogen oxides in the flue gases, and
a screen with at least one heat exchanger located in the flue gas passage upstream of the feeder, wherein the screen covers an entire horizontal cross-sectional area of the furnace zone, forming a volume in the recovery boiler defined by the walls of the recovery boiler that is downstream of the screen and upstream of the superheater zone to introduce and react the reducing agent prior to the flue gas reaching the superheater zone, the at least one heat exchanging surface is configured to decrease the temperature of the flue gas to a certain temperature range determined based on a desired flue gas temperature for the introduction of the reducing agent.

12. The recovery boiler according to claim 11, wherein said at least one heat exchanger in the screen is connected to the boiler water circulation system and steam flowing in the system is superheated in the heat exchanger which receives heat energy from the flue gases.

13. The recovery boiler according to claim 11, wherein the feeder for the reducing agent is connected to a boiler combustion air system or a flue gas discharge system such that combustion air or circulated flue gas is a carrier gas for the introduction of the reducing agent.

14. The recovery boiler according to claim 11, wherein the feeder for the reducing agent is connected to a gas source which supplies a carrier gas for the introduction of the reducing agent.

15. The recovery boiler according to claim 11, wherein the feeder for the reducing agent is connected to the flue gas discharge system of another boiler for using circulated flue gas as carrier gas in the introduction of the reducing agent.

16. The recovery boiler according to claim 11, wherein the recovery boiler is a chemical recovery boiler of a chemical pulp mill.

17. A method to reduce nitrogen oxides exhausted from a recovery boiler including a waste liquor nozzle, a smelt spout, and walls defining a gas path including a furnace zone and a superheater zone downstream of the furnace zone wherein a bullnose in at least one of the walls forms a narrowed portion of the gas path and separates the furnace zone and the superheater zone, the method comprising:
injecting a waste liquor into the furnace zone from the waste liquor nozzle;
combusting the injected waste liquor and air in the furnace zone and generating flue gases and smelt from the combustion;
discharging the smelt from the smelt spout;
as the flue gases flow upward through the furnace zone, cooling the flue gases to a suitable temperature range by passing the flue gases through a screen including at least one heat exchanger, wherein the screen covers an entire cross section of the gas path and is in the furnace zone and upstream of the bullnose,
introducing an agent into the flue gas in a volume in the recovery boiler between the walls, downstream of the screen, and upstream of the superheater zone;
shielding the introduced agent from radiant heat from the furnace zone by the screen between the agent and the furnace zone;
reducing nitrogen oxides in the cooled flue gases flowing through the volume, whereby a reaction between the agent and the cooled flue gases forms flue gases with reduced nitrogen oxides;
flowing the flue gases with reduced nitrogen oxides through the gas path from the volume in the furnace zone and into the superheater zone;
flowing the flue gases with reduced nitrogen oxides through a superheater arranged in the superheater zone of the gas path, and
transferring heat from the flue gases with reduced nitrogen oxides to steam flowing through the superheater.

18. A steam-generating recovery boiler comprising:
walls defining a flue gas passage, wherein the flue gas passage includes a furnace zone and a superheater zone;

a waste liquor nozzle extending through at least one of the walls and configured to inject a waste liquor into the furnace zone;

a smelt spout at or near a bottom of the recovery boiler;

superheaters in the superheater zone and in the flue gas passage;

a bullnose in at least one of the walls between the furnace zone and the superheater zone, the nose is aligned with a narrowest region of the flue gas passage;

heat recovery surfaces in the superheater zone and arranged within the flue gas passage;

a furnace within which the waste liquor is combusted and flue gases and smelt are generated, wherein the furnace is within the furnace zone;

the walls adjacent the furnace zone extend upward and the flue gas passage extends upward through the furnace zone, and the walls include water tubes;

a feeder extending through the walls upstream of the superheater zone, and configured to introduce a reducing agent into the flue gases in the furnace zone, wherein the reducing agent reduces nitrogen oxides in the flue gases;

a screen including at least one heat exchanger, wherein the screen covers an entire cross section of the flue gas passage and is upstream of the feeder in the furnace zone, wherein the at least one heat exchanger in the screen is configured to decrease the temperature of the flue gas to a certain temperature range selected for introduction of the reducing agent from the feeder, and a circulation system in which water and/or steam flows through the at least one heat exchanger in the screen, the superheaters in the superheater zone and the water tubes in the walls of the recovery boiler.

19. A method to decrease nitrogen oxides in flue gases flowing through a recovery boiler, wherein the recovery boiler includes a furnace, a waste liquor injection nozzle aligned with the furnace, a smelt spout below the furnace, and a gas path defined by walls of the recovery boiler, the walls including water tubes and the gas path including a furnace zone and a superheater zone separated by a bullnose in the walls from the furnace zone, wherein the bullnose which forms a narrow region of the gas path, the recovery boiler further including a water circulation system comprising superheaters in the superheater zone, at least one heat exchanger in a screen in the furnace zone, and the water tubes in the walls, the method comprising:

injecting a waste liquor from the waste liquor nozzle into the furnace;

combusting the injected waste liquor and with oxygen in the furnace zone, wherein the combustion generates gases containing nitrogen oxides and smelt;

discharging the smelt through the smelt spout;

confining the flue gases to the gas path extending from the furnace zone, past the bullnose, through the superheater zone and exhausts from the recovery boiler, cooling the flue gases by passing the flue gases through the screen and the at least one heat exchanger in the screen; wherein the flue gases are cooled to temperature within a certain temperate range selected based on the agent to be injected conforms to temperatures suited to the introduction of the agent and the reduction of nitrogen oxides;

introducing an agent into the furnace zone of the gas path downstream in the gas path of the screen and below or at a common elevation with the bullnose, wherein the introduction of the agent reduces nitrogen oxides in the flue gases;

shielding the introduced agent from radiant heat from the furnace by the screen between the introduced agent and the furnace;

moving the flue gases through a portion the gas path downstream of the superheater zone and having a distance selected to promote reactions between the agent and flue gases, wherein the portion of the gas path extends from the at least one heat exchanger to the superheater zone and extends past the bullnose, wherein the distance of the portion of the gas path is greater than a distance between the screen and the introduction of the agent.

* * * * *